United States Patent Office 3,557,201
Patented Jan. 19, 1971

3,557,201
PROCESS FOR THE PREPARATION OF ADIPIC ACID
Jacques Boichard, Bernard Brossard, Michel Gay, and Raymond Janin, Lyon, France, assignors to Rhone-Poulenc S.A., Paris, France, a French body corporation
No Drawing. Filed Dec. 15, 1967, Ser. No. 690,742
Claims priority, application France, Dec. 28, 1966, 89,203
Int. Cl. C07c 55/14
U.S. Cl. 260—537                    3 Claims

ABSTRACT OF THE DISCLOSURE

Adipic acid is prepared in high yield by oxidising ε-caprolactone at 0° to 20° C. with nitric acid of 40 to 80% concentration.

---

This invention relates to the preparation of adipic acid by oxidation of ε-caprolactone.

It is known [Ullmans Encyclopädie der Technischen Chemie, 3, 95 (1953)] that adipic acid may be prepared by oxidation of cyclohexane with air with the production of cyclohexanol, cyclohexanone, ε-hydroxycaproic acid and ε-caprolactone, which is subjected to an oxidation with nitric acid, optionally in the presence of catalysts. The adipic acid yields of these various processes are poor because of the formation of a large number of by-products such as glutaric acid and succinic acid. Moreover, the consumption of nitric acid in the form of irrecoverable nitrogen is high.

In French Pat. No. 1,400,437, it has been proposed to obviate the disadvantages of the earlier processes by a process which consists of oxidising cyclohexanone, in a first stage, to ε-caprolactone, for example with an organic peracid or hydrogen peroxide in the presence of formic acid, and, in a second stage, oxidising the ε-caprolactone with nitric acid in a concentration of from 30% to 80%, preferably from 40% to 65%, by weight, at a temperature of from 30° to 100° C. With this procedure, the crude adipic acid yield, calculated on the ε-caprolactone, is of the order of 83%. The consumption of nitric acid in irrecoverable form, however, still remains high.

It has now been found, and this forms the subject of the present invention, that adipic acid may be prepared in yields of more than 95% of pure product, without giving rise to nitrogen derivatives which cannot be reconverted into nitric acid, if the oxidation of the ε-caprolactone with nitric acid is carried out under conditions such that the $HNO_3$ concentration in the reaction medium is from 40% to 80% by weight throughout the operation and if, in addition, the temperature of the reaction medium is maintained at from 0° to 20° C. It has moreover been found that the presence, in the nitric acid employed, of nitrogen oxides having a degree of oxidation of 2 to 4, such as NO and nitrous acid, accelerates the start of the reaction.

When the nitric acid oxidation of ε-caprolactone is carried out at from 0° to 20° C., and preferably from 0° to 10° C., it is found that there is substantially no formation of glutaric acid and succinic acid.

The presence of nitrogen oxides having a degree of oxidation of 2 to 4 in the nitric acid employed initiates the reaction. The quantity of these oxides introduced at the beginning may be up to 10% by weight of the starting nitric acid solution.

In practice, ε-caprolactone is gradually added to an aqueous nitric acid solution, the quantity of which is such that, taking into account its concentration and the weight of ε-caprolactone to be oxidised, the final $HNO_3$ concentration is at least equal to 40% by weight. The ε-caprolactone may also be added to an aqueous nitric acid solution having a predetermined concentration of $HNO_3$ (from 40% to 80% by weight), which is maintained at its initial value, or substantially at its initial value, throughout the reaction by the gradual addition of nitric acid of higher concentration. Regardless of the procedure adopted, the adipic acid formed precipitates as it is formed.

The nitric acid consumed in the course of the reaction is converted into nitrous acid. The solution of nitrous acid in nitric acid obtained after filtration of the adipic acid may be reoxidised by air or oxygen to regenerate the nitric acid and may be reused in a subsequent oxidising operation. The nitrous acid may also be partially reoxidised in the course of the oxidising reaction by passing a current of oxygen or air through the reaction mass; this procedure is particularly suitable for the continuous performance of the process. It is necessary in this case to ensure that a sufficient quantity of nitrogen oxides of a degree of oxidation of 2 to 4, and notably of nitrous acid, is maintained in the reaction medium to ensure a rapid initiation of the reaction.

The following examples illustrate the invention.

EXAMPLE I 70 g. of an aqueous nitric acid solution containing 63% by weight of $HNO_3$ (0.7 mol. of $HNO_3$) are introduced into a 125-cc. round-bottomed flask provided with a thermometer, a stirring system, a dropping funnel and a reflux condenser and cooled by an ice water bath. The solution is maintained at a temperature of 0° to 5° C., and 11.4 g. (0.1 mol. of ε-caprolactone) are then added in 45 minutes with stirring. The mixture is maintained at 0° to 5° C. for 70 minutes.

The adipic acid which has precipitated is filtered off, washed with 2× 20 cc. of ice water and then with 2× 15 cc. of diethyl ether, separated and dried in an oven at 110° C. under atmospheric pressure. 12.3 g. of pure adipic acid melting at 152° C. are thus obtained. Taking into account the adipic acid in the mother liquors and the washing liquors, the total adipic acid yield amounts to 96% of theory. In addition, a little succinic acid (of a quantity corresponding to 2.5% by weight of the lactone employed) is formed in the reaction. Titration of the nitrogen in the reaction mass shows a consumption of nitric acid in the form of nitrogen and $N_2O$ of the order of 10 g. per kg. of adipic acid prepared.

EXAMPLE II

Into a 250-cc. round-bottomed flask provided with a stirring system, a thermometer, a reflux condenser supplied with iced water, a dropping funnel and a dipping tube for the admission of oxygen are introduced: 206.1 g. of a 63% aqueous $HNO_3$ solution (i.e. 2.06 mol. of $HNO_3$), 23.65 g. of distilled water, and 11.05 g. of nitrogen peroxide.

The contents of the flask are maintained at 0° C., 34.25 g. of ε-caprolactone (0.3 mol.) are then added in 4 hours 15 minutes. After the addition has proceeded for 1 hour 15 minutes, a current of oxygen is introduced into the reaction mass at a rate of 2 litres per hour, measured under normal pressure and temperature conditions. All the oxygen employed is absorbed.

When the addition of the lactone is complete, the introduction of oxygen is stopped, and the reaction mass is maintained at 0° C. for a further 60 minutes.

The balance of the reaction is as follows:

|   | Percent |
|---|---|
| Adipic acid yield | 98.7 |
| Glutaric acid yield | 0.9 |
| Succinic acid yield | 0.2 | calculated on the caprolactone oxidised.

At the end of the reaction, 83.5% of adipic acid was recovered in pure form, melting at 152° C.

The consumption of nitric acid in the form of irrecoverable nitrogen amounts to 5 g./kg. of adipic acid produced.

We claim:

1. Process for the preparation of adipic acid, which comprises oxidising ε-caprolactone with aqueous nitric acid at 0° to 10° C., while maintaining the nitric acid concentration in the reaction medium at 40% to 80% by weight throughout the oxidation.

2. Process according to claim 1, wherein the aqueous nitric acid contains up to 10% by weight of nitrogen oxides having a degree of oxidation of 2 to 4.

3. Process according to claim 1, wherein the nitric acid is partially regenerated by passing therethrough a current of oxygen or of an oxygen-containing gas.

References Cited

UNITED STATES PATENTS

| | | | |
|---|---|---|---|
| 2,452,741 | 11/1948 | Fleming | 260—537 |
| 2,844,626 | 7/1958 | Kamlet | 260—537 |

FOREIGN PATENTS

| | | | |
|---|---|---|---|
| 1,400,437 | 4/1965 | France | 260—537 |

LORRAINE A. WEINBERGER, Primary Examiner

V. GARNER, Assistant Examiner